United States Patent
Mathew et al.

(10) Patent No.: US 11,128,489 B2
(45) Date of Patent: Sep. 21, 2021

(54) MAINTAINING DATA-PLANE CONNECTIVITY BETWEEN HOSTS

(71) Applicant: Nicira, Inc., Palo Alto, CA (US)

(72) Inventors: Subin Cyriac Mathew, Palo, CA (US); Ankur Kumar Sharma, Palo Alto, CA (US); Alexander Tessmer, Palo Alto, CA (US); Vivek Agarwal, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 578 days.

(21) Appl. No.: 15/652,236

(22) Filed: Jul. 18, 2017

(65) Prior Publication Data

US 2019/0028300 A1 Jan. 24, 2019

(51) Int. Cl.
*H04L 12/46* (2006.01)
*H04L 12/26* (2006.01)
*H04L 12/24* (2006.01)
*H04L 29/08* (2006.01)
*H04L 29/06* (2006.01)

(Continued)

(52) U.S. Cl.
CPC ...... *H04L 12/4633* (2013.01); *G06F 9/45558* (2013.01); *H04L 41/0668* (2013.01); *H04L 41/0836* (2013.01); *H04L 43/08* (2013.01); *H04L 43/0811* (2013.01); *H04L 45/74* (2013.01); *H04L 67/10* (2013.01); *H04L 69/22* (2013.01); *G06F 2009/45579* (2013.01); *G06F 2009/45595* (2013.01); *H04L 43/0817* (2013.01); *H04L 43/0829* (2013.01); *H04L 43/0852* (2013.01); *H04L 43/0864* (2013.01); *H04L 43/0876* (2013.01)

(58) Field of Classification Search
CPC ..... H04L 12/4633; H04L 67/10; H04L 43/08; H04L 41/0668; H04L 41/0836; H04L 45/74; H04L 43/0811; H04L 43/0817; H04L 43/0829; H04L 43/0852; H04L 43/0864; H04L 43/0876; H04L 69/22; G06F 9/45558; G06F 2009/45579; G06F 2009/45595

See application file for complete search history.

(56) References Cited

U.S. PATENT DOCUMENTS

2010/0046512 A1* 2/2010 Xia ............... H04L 12/4633 370/389
2011/0292813 A1* 12/2011 Dunbar ........... H04L 12/4641 370/244

(Continued)

*Primary Examiner* — Harry H Kim
(74) *Attorney, Agent, or Firm* — Su IP Consulting

(57) ABSTRACT

Example methods are provided for a first host to maintain data-plane connectivity with a second host via a third host in a virtualized computing environment. The method may comprise identifying an intermediate host, being the third host, having data-plane connectivity with both the first host and the second host. The method may also comprise: in response to detecting, from a first virtualized computing instance supported by the first host, an egress packet that includes an inner header addressed to a second virtualized computing instance supported by the second host, generating an encapsulated packet by encapsulating the egress packet with an outer header that is addressed from the first host to the third host instead of the second host; and sending the encapsulated packet to the third host for subsequent forwarding to the second host.

21 Claims, 7 Drawing Sheets

(51) Int. Cl.
*H04L 12/741* (2013.01)
*G06F 9/455* (2018.01)

(56) References Cited

U.S. PATENT DOCUMENTS

| | | | |
|---|---|---|---|
| 2013/0016652 A1* | 1/2013 | Ke | H04W 40/10 |
| | | | 370/315 |
| 2017/0149632 A1* | 5/2017 | Saltsidis | H04L 41/0668 |
| 2017/0346731 A1* | 11/2017 | Pukhraj Jain | H04L 12/4633 |
| 2018/0184281 A1* | 6/2018 | Tamagawa | H04L 61/2007 |
| 2018/0212798 A1* | 7/2018 | Shang | H04L 12/4633 |
| 2018/0337827 A1* | 11/2018 | Xiao | H04L 12/4641 |
| 2019/0132150 A1* | 5/2019 | Ramachandran | H04L 12/4633 |

* cited by examiner

MAINTAINING DATA-PLANE CONNECTIVITY BETWEEN HOSTS

BACKGROUND

Unless otherwise indicated herein, the approaches described in this section are not admitted to be prior art by inclusion in this section.

Virtualization allows the abstraction and pooling of hardware resources to support virtual machines in a Software-Defined Data Center (SDDC). For example, through server virtualization, virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc.

Further, through software defined networking (SDN), benefits similar to server virtualization may be derived for networking services. For example, logical overlay networks may be provided that are decoupled from the underlying physical network infrastructure, and therefore may be provisioned, changed, stored, deleted and restored programmatically without having to reconfigure the underlying physical hardware. To facilitate communication between virtual machines located on a logical overlay network, hosts require data-plane connectivity with each other. In practice, however, data-plane connectivity between a pair of hosts may be lost, or degrade over time. In other cases, the data-plane connectivity may be implemented in a more cost-effective manner.

DETAILED DESCRIPTION

Figure 1:
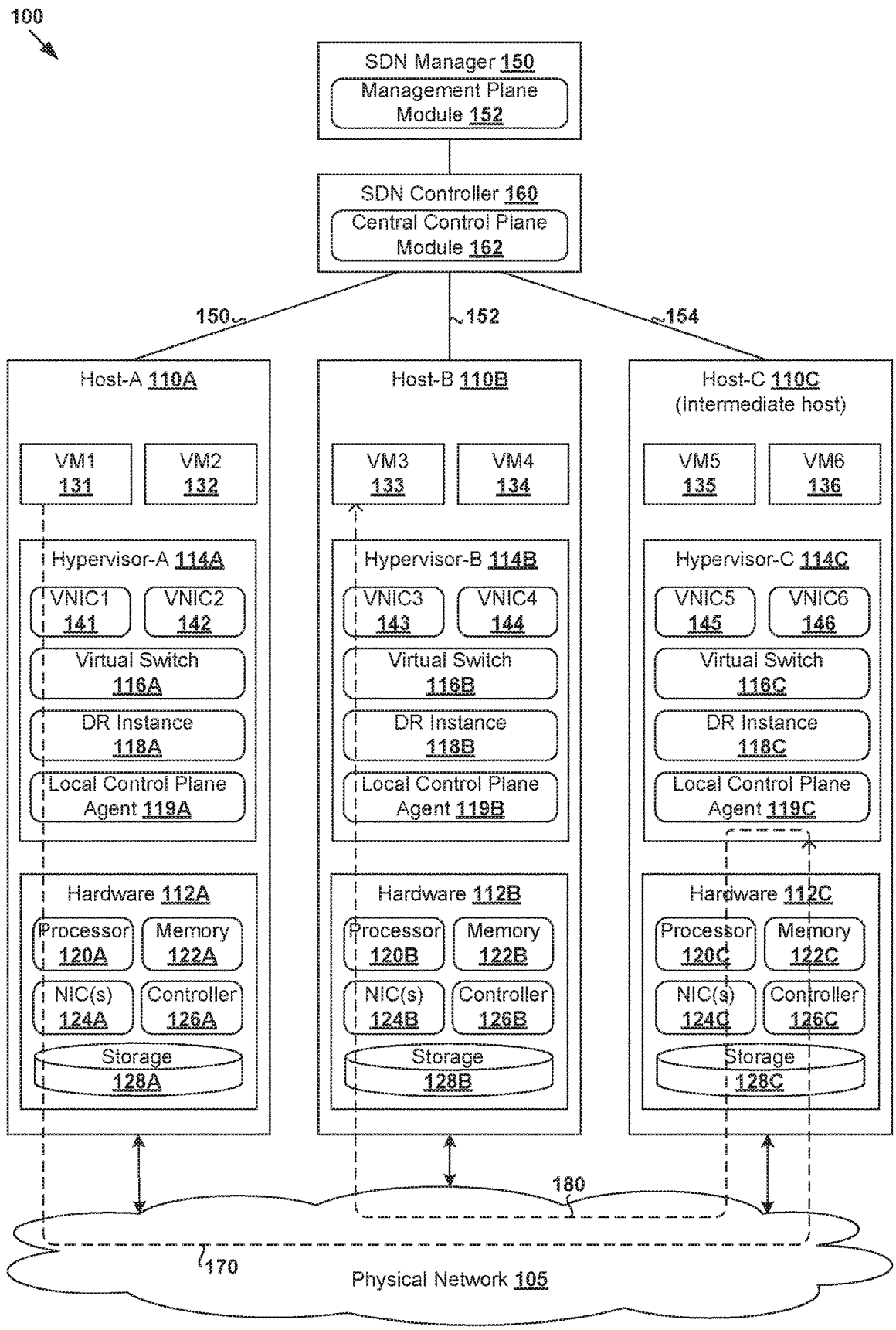
FIG. 1 is a schematic diagram illustrating an example virtualized computing environment in which data-plane connectivity may be maintained between a first host and a second host via a third host.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to data-plane connectivity between hosts will now be explained in more detail using FIG. 1, which is a schematic diagram illustrating example virtualized computing environment 100 in which data-plane connectivity may be maintained between a first host and a second host. It should be understood that, depending on the desired implementation, virtualized computing environment 100 may include additional and/or alternative components than that shown in FIG. 1.

In the example in FIG. 1, virtualized computing environment 100 includes multiple hosts, such as host-A 110A, host-B 110B and host-C 110C that are interconnected via physical network 105. Each host 110A/110B/110C includes suitable hardware 112A/112B/112C and virtualization software (e.g., hypervisor-A 114A, hypervisor-B 114B, hypervisor-C 114C) to support various virtual machines. For example, host-A 110A supports VM1 131 and VM2 132; host-B 110B supports VM3 133 and VM4 134; and host-C 110C supports VM5 135 and VM6 136. In practice, virtualized computing environment 100 may include any number of hosts (also known as a "host computers", "host devices", "physical servers", "server systems", etc.), where each host may be supporting tens or hundreds of virtual machines.

Although examples of the present disclosure refer to virtual machines, it should be understood that a "virtual machine" running on host 110A/110B/110C is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The virtual machines may also be complete computational environments, containing virtual equivalents of the hardware and software components of a physical computing system. The term "hypervisor" may refer generally to a software layer or component that supports the execution of multiple virtualized computing instances, including system-level software in guest virtual machines that supports namespace containers such as Docker, etc.

Hypervisor 114A/114B/114C maintains a mapping between underlying hardware 112A/112B/112C and virtual resources allocated to respective virtual machines 131-136. Hardware 112A/112B/112C includes suitable physical components, such as central processing unit(s) or processor(s) 120A/120B/120C; memory 122A/122B/122C; physical network interface controllers (NICs) 124A/124B/124C; and storage disk(s) 128A/128B/128C accessible via storage controller(s) 126A/126B/126C, etc. Virtual resources are allocated to each virtual machine to support a guest operating system (OS) and applications. Corresponding to hardware 112A/112B/112C, the virtual resources may include virtual CPU, virtual memory, virtual disk, virtual network interface controller (VNIC), etc. In the example in FIG. 1, virtual machines 131-136 are associated with respective VNICs 141-146. Although one-to-one relationships are shown, one virtual machine may be associated with multiple VNICs (each VNIC having its own network address).

Hypervisor 114A/114B/114C also implements virtual switch 116A/116B/116C and logical distributed router (DR) instance 118A/118B/118C to handle egress packets from, and ingress packets to, corresponding virtual machines 131-136. In practice, logical switches and logical distributed routers may be implemented in a distributed manner and can span multiple hosts to connect virtual machines 131-136. For example, logical switches that provide logical layer-2 connectivity may be implemented collectively by virtual switches 116A-C and represented internally using forwarding tables (not shown) at respective virtual switches 116A-C. Further, logical distributed routers that provide logical layer-3 connectivity may be implemented collectively by DR instances 118A-C and represented internally using routing tables (not shown) at respective DR instances 118A-C.

SDN manager 150 and SDN controller 160 are network management entities that facilitate implementation of software-defined (e.g., logical overlay) networks in virtualized computing environment 100. One example of an SDN controller is the NSX controller component of VMware NSX® (available from VMware, Inc.) that operates on a central control plane. SDN controller 160 may be a member of a controller cluster (not shown) that is configurable using SDN manager 150 operating on a management plane. Network management entity 150/160 may be implemented using physical machine(s), virtual machine(s), or both. Logical switches, logical routers, and logical overlay networks may be configured using SDN manager 150, SDN controller 160, etc.

SDN controller 160 is also responsible for collecting and disseminating control information relating to logical overlay networks and overlay transport tunnels, such as logical network topology, membership information of logical overlay networks, mobility of the members, protocol-to-hardware address mapping information of the members, VTEP information, firewall rules and policies, etc. To send and receive the control information, local control plane (LCP) agent 119A/119B/119C on host 110A/110B/110C requires control-plane connectivity 150/152/154 with SDN controller 160. As used herein, the term "control-plane connectivity" may refer generally the ability of SDN controller 160 and host 110A/110B/110C to communicate with each other, such as over a management network. For example, a control-plane channel may be established between SDN controller 160 and host 110A/110B/110C using Transmission Control Protocol (TCP) over Secure Sockets Layer (SSL), etc.

To facilitate communication among members of a logical overlay network, hypervisor 114A/114B/114C implements a virtual tunnel endpoint (VTEP) to encapsulate egress packets from a source with an outer (tunnel) header identifying the logical overlay network. The VTEP also performs decapsulation before virtual switch 116A/116B/116C forwards (decapsulated) packets to a destination. In the example in FIG. 1, VTEP-A may be implemented by hypervisor-A 114A, VTEP-B by hypervisor-B 114B, and VTEP-C by hypervisor-C 114C (the VTEPs are not shown for simplicity). As used herein, the term "packet" may refer generally to a group of bits that can be transported together from a source to a destination, such as segment, frame, message, datagram, etc.

A logical overlay network may be formed using any suitable protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts. In the example in FIG. 1, VM1 131, VM3 133, VM5 135 and VM6 136 may be members of a first VXLAN (e.g., VXLAN5001), and VM2 132 and VM4 134 of a second VXLAN (e.g., VXLAN5002). The term "layer 2" may refer generally to a Media Access Control (MAC) layer; and "layer 3" to a network or Internet Protocol (IP) layer in the Open System Interconnection (OSI) model, although the concepts described may be used with other networking models.

To facilitate communication among members of a logical overlay network, host 110A/110B/110C also requires data-plane connectivity with other host(s). For example, for VM1 131 to communicate with VM3 133 on VXLAN5001, host-A 110A requires layer-3 data-plane connectivity with host-B 110B. As used herein, the term "data-plane connectivity" may refer generally to the ability of two hosts to communicate with each other over physical network 105. The data-plane connectivity (e.g., layer-3 tunnel) between a pair of hosts may be provided by any suitable interconnected network devices in physical network 105, such as physical routers, physical switches, etc.

In practice, however, the data-plane connectivity between a pair of hosts may be lost, or degrade over time, due to various reasons such as configuration changes, failures (e.g., hardware and/or software), network congestion, etc. For example in FIG. 1, in a multi-site deployment, host-A 110A located at one site might lose data-plane connectivity with host-B 110B located at a different site. In this case, conventionally, host-A 110A and host-B 110B may have to wait until data-plane connectivity is improved or restored before packet communication may be resumed. This causes service disruption, which adversely affects the performance of host(s) and associated logical overlay network(s) in virtualized computing environment 100. In another example, although there is data-plane connectivity between host-A 110A and host-B 110B, it may not be cost-effective for them to communicate with each other directly.

Maintaining Data-Plane Connectivity

According to examples of the present disclosure, data-plane connectivity between host-A 110A and host-B 110B may be maintained using an intermediate host. For example in FIG. 1, the intermediate host may be host-C 110C, which has data-plane connectivity with both host-A 110A and host-B 110B. This way, host-A 110A may maintain (indirect) data-plane connectivity with host-B 110B through host-C 110C where their (direct) data-plane connectivity is lost, has performance issue(s) or associated with a higher cost. Examples of the present disclosure may facilitate high availability of data-plane connectivity among hosts 110A-C, improve resilience towards failures, reduce the likelihood (or duration) of disruption and improve cost efficiency. This in turn improves the performance of hosts 110A-C and associated logical overlay networks in virtualized computing environment 100.

Figure 2:
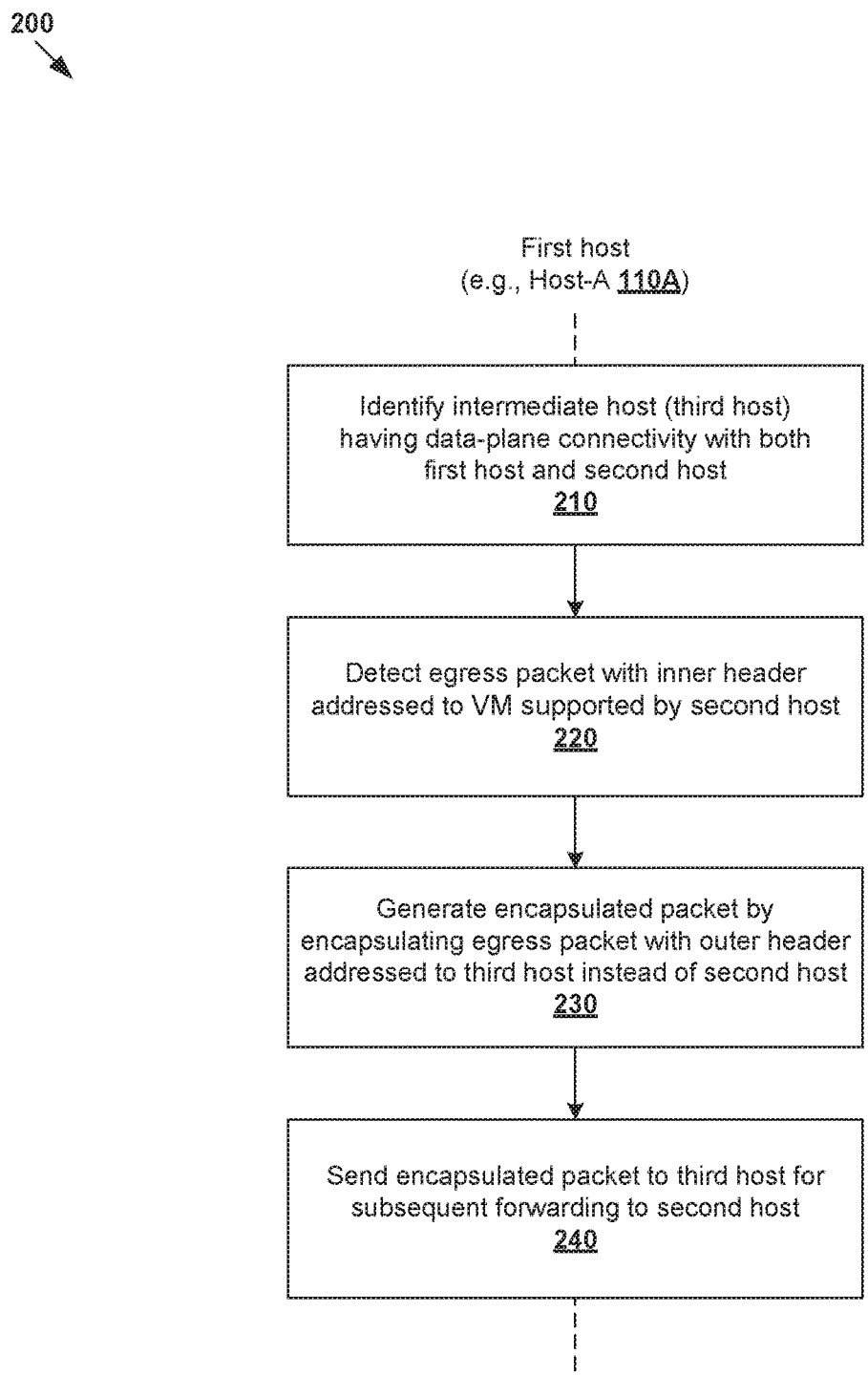
FIG. 2 is a flowchart of an example process for a first host to maintain data-plane connectivity with a second host via a third host in a virtualized computing environment.

In more detail, FIG. 2 is a flowchart of example process 200 for a first host to maintain data-plane connectivity with a second host via a third host in virtualized computing environment 100. Example process 200 may include one or more operations, functions, or actions illustrated by one or more blocks, such as 210 to 240. The various blocks may be combined into fewer blocks, divided into additional blocks, and/or eliminated depending on the desired implementation. Throughout the present disclosure, various examples will be explained using host-A 110A as an example "first host"; host-B 110B as "second host"; and host-C 110C as "third host" or "intermediate host," VM1 131 as "first virtualized computing instance," VM3 133 as "second virtualized computing instance," and SDN controller 160 as "network management entity." In practice, example process 200 may be implemented by any suitable "first host" 110A/110B/110C using hypervisor 114A/114B/114C, etc.

At 210 in FIG. 2, host-A 110A identifies an intermediate host, being host-C 110C, having data-plane connectivity with both host-A 110A and host-B 110B. At 220 and 230, in response to detecting, from VM1 131 supported by host-A 110A, an egress packet that includes an inner header addressed to VM3 133 supported by host-B 110B, host-A 110A generates an encapsulated packet that includes an outer header that is addressed to host-C 110C instead of host-B 110B. At 240, the encapsulated packet is sent to host-C 110C (see 170 in FIG. 1) for subsequent forwarding to host-B 110B (see 180 in FIG. 1).

As will be described further using FIG. 3 and FIG. 4, host-C 110C may be identified at block 220 based on configuration information received from SDN controller 160. In one example, host-C 110C may be selected by SDN controller 160 based on one or more of the following criteria: round trip time, network bandwidth, packet loss, packet delay, a load balancing factor, CPU utilization, memory utilization, network resource utilization, physical location, whether host-C 110C is already configured as an intermediate host for another pair of hosts, etc.

In another example, host-C 110C may be selected based on a comparison between (a) a first cost associated with a first path from host-A 110A to host-B 110B and (b) a second cost associated with a second path from host-A 110A to host-B 110B via host-C 110C. It should be understood that the example in FIG. 2 may be performed in response to detecting a data-plane connectivity issue between host-A 110A and host-B 110B, or alternatively, when no data-plane connectivity issue is detected. The "data-plane connectivity issue" may be a loss of data-plane connectivity, or a performance issue associated with the data-plane connectivity.

As will be described further using FIG. 5 and FIG. 6, the encapsulated packet may be generated at block 230 by configuring the outer header to include address information of a source VTEP implemented by host-A 110A and destination VTEP implemented by host-C 110C, and an identifier of a logical overlay network on which VM1 131 is located. Depending on the desired implementation, the outer header may also include a bit to indicate, to host-C 110C, that the encapsulated packet is not destined for host-C 110C and should be forwarded to another host. Prior to forwarding the encapsulated packet to host-B 110B, host-C 110C may modify the outer header to address the encapsulated packet to destination host-B 110B.

As will be described further using FIG. 7, multiple intermediate hosts may be selected to maintain data-plane connectivity (i.e., more than two hops from host-A 110A to host-B 110B). In this case, host-C 110C may have indirect data-plane connectivity with host-B 110B via another host, such as host-D 110D.

Configuration

Figure 3:
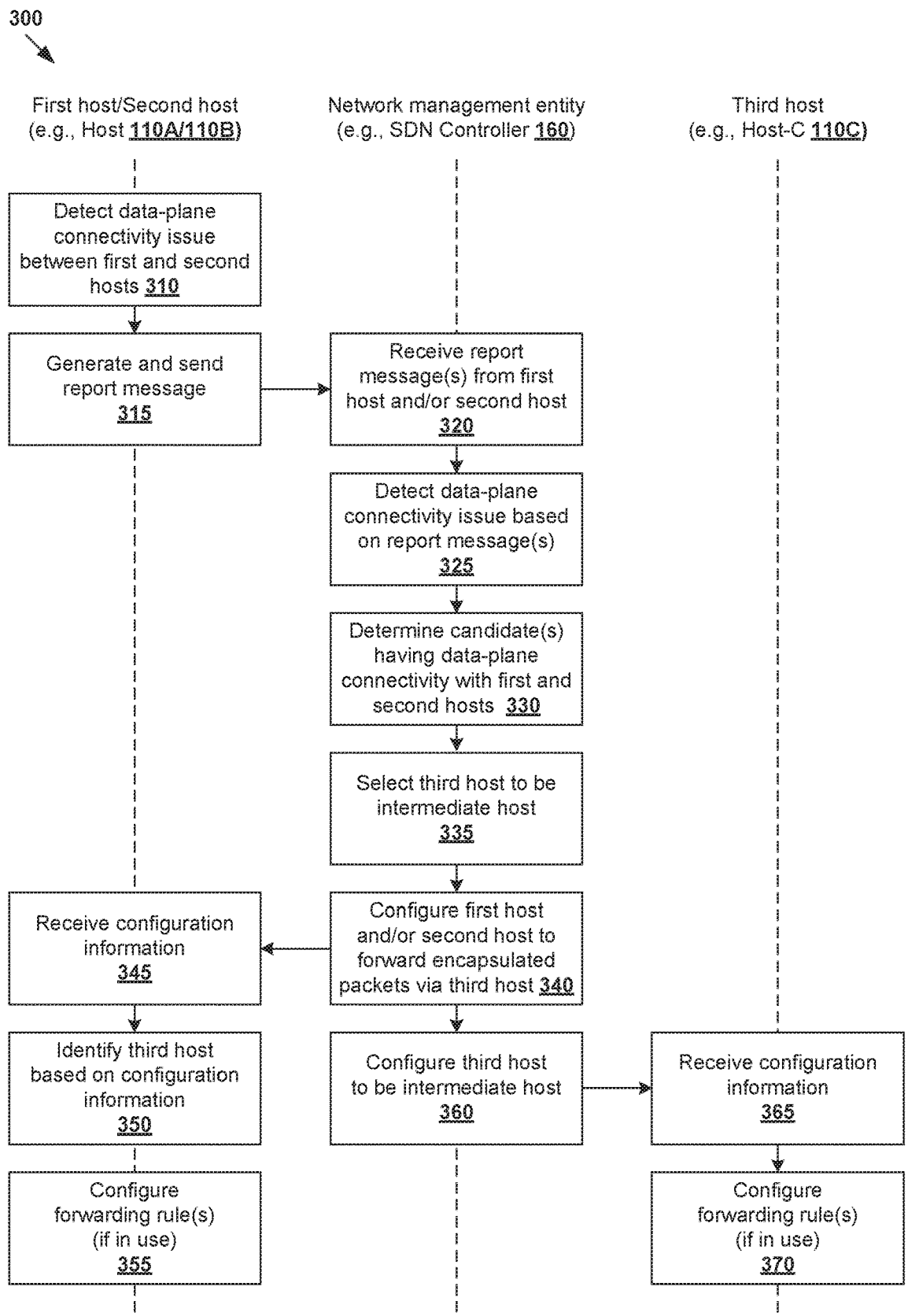
FIG. 3 is a flowchart of an example detailed process for configuring a first host to maintain data-plane connectivity with a second host via a third host in a virtualized computing environment.

FIG. 3 is a flowchart of example detailed process 300 for configuring a first host to maintain data-plane connectivity with a second host via a third host in virtualized computing environment 100. Example process 300 may include one or more operations, functions, or actions illustrated by one or more blocks, such as 310 to 370. The various blocks may be combined into fewer blocks, divided into additional blocks, and/or eliminated depending on the desired implementation. Example process 300 may be implemented by host 110A/110B/110C using hypervisor 114A/114B/114C, and SDN controller 160 using central control plane module 162, etc. Depending on the desired implementation, it is not necessary to perform blocks 310-325 prior to selecting an intermediate host at blocks 330-335.

Example process 300 will be explained using FIG. 4, which is a schematic diagram illustrating example configuration 400 for maintaining data-plane connectivity between a first host and a second host via a third host in virtualized computing environment 100. In the example in FIG. 4, virtualized computing environment 100 further includes host-D 110D, which supports hypervisor-D 114D, VM7 137 and VM8 138. Similar to hosts 110A-C, host-D 110D includes various software and hardware components, the explanation of which is not repeated here for brevity.

At 310 and 315 in FIG. 3, in response to detecting a data-plane connectivity issue between host-A 110A and host-B 110B, host-A 110A sends a report message to SDN controller 160 accordingly. To facilitate the detection at block 310, an a priori monitoring session may be configured between each pair of hosts to exchange connectivity status information at predetermined time intervals. In this case, the data-plane connectivity issue may be detected based on connectivity status information received from host-B 110B via the monitoring session, or the absence thereof.

Any suitable protocol may be used for tunnel health detection, such as Bidirectional Forwarding Detection (BFD), Connectivity Fault Management (CFM), etc. Using BFD as an example, a BFD session may be established every pair of hosts for data-path liveness check. From the perspective of host-A 110A, three BFD sessions may be established with respective host-B 110B, host-C 110C and host-D 110D. Each BFD session may be implemented using a pair of BFD agents (not shown for simplicity) implemented by respective hosts.

Figure 4:
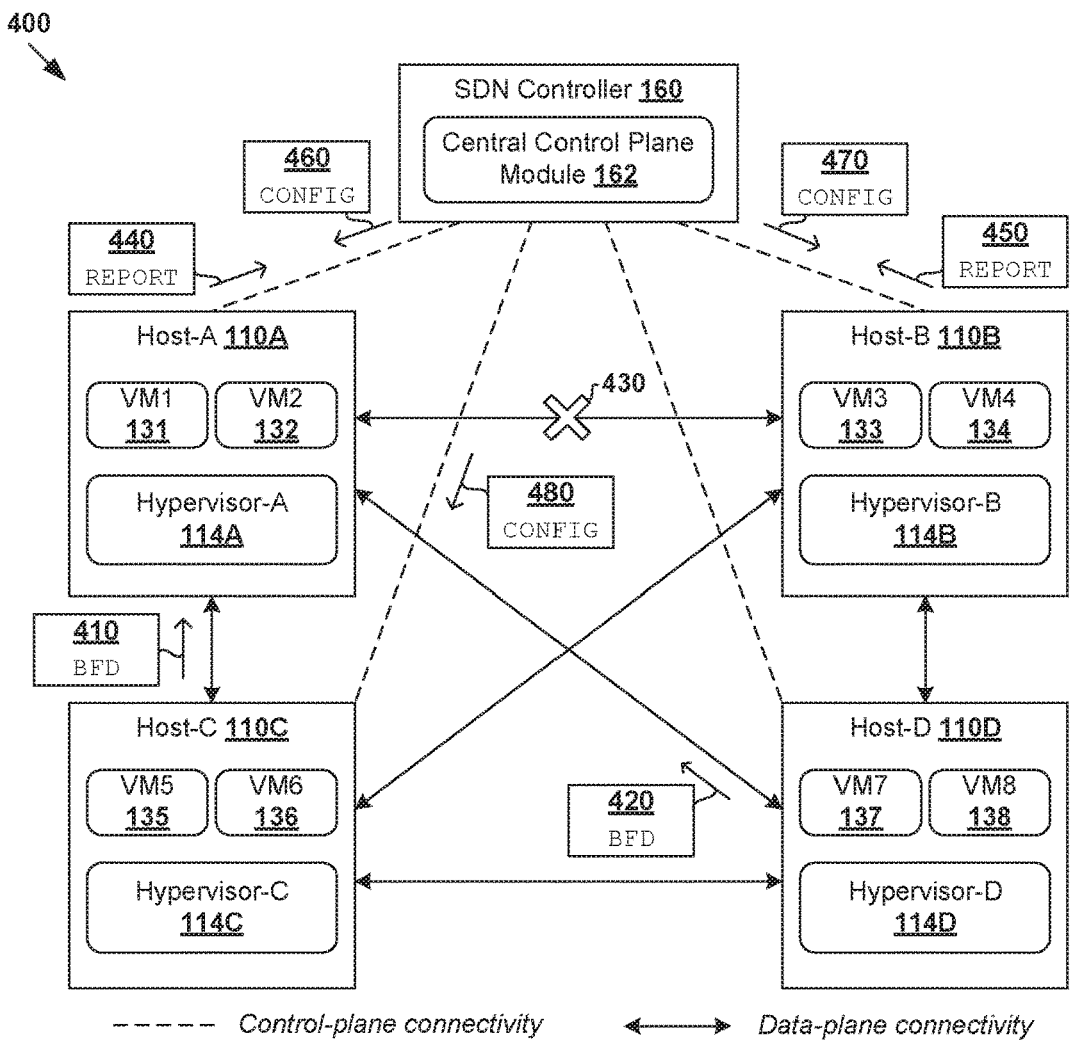
FIG. 4 is a schematic diagram illustrating example configuration for maintaining data-plane connectivity between a first host and a second host via a third host in a virtualized computing environment.

In the example in FIG. 4, in response to receiving a first BFD message (see 410) from host-C 110C and a second BFD message (see 420) from host-D 110D, host-A 110A may determine that VTEP-A has data-plane connectivity with both VTEP-C at host-C 110C and VTEP-D at host-D 110D. However, since no BFD message is received from host-B 110B after a predetermined interval, host-A 110A detects a loss of data-plane connectivity (see 430) with host-B 110B, particularly between VTEP-A and VTEP-B. As such, a report message (see 440) indicating the loss of data-plane connectivity issue is generated and sent to SDN controller 160.

The data-plane connectivity issue detected at block 310 may also be a performance issue. For example, in response to receiving a BFD message from host-B 110B, host-A 110A may determine that it has data-plane connectivity with host-B 110B. However, based on the content (e.g., metadata) of the BFD message, loss of BFD messages or other information, host-A 110A may determine that a metric associated with the data-plane connectivity does not satisfy a predetermined threshold. Any suitable performance metric(s) may be used, such as RTT, network bandwidth, packet loss, packet delay, a combination thereof, etc. For example, if there is a (strict) service-level agreement (SLA) that specifies a target RTT between host-A 110A and host-B 110B, the performance issue is detected when the measured RTT exceeds the target RTT. A weighted combination of metrics may also be used.

At 320 in FIG. 3, SDN controller 160 receives the report message (see 440 in FIG. 4) from host-A 110A. Alternatively or additionally, SDN controller 160 receives a report message (see 450) from host-B 110B reporting the same data-plane connectivity issue with host-A 110A. Depending on the desired implementation, SDN controller 160 may also receive a report message (not shown) from host 110C/110D reporting that host 110C/110D has data-plane connectivity with every other host. Otherwise, SDN controller 160 may consider the absence of any report message from host 110C/110D as an indication of the lack of data-plane connectivity issue.

At 325 in FIG. 3, SDN controller 160 detects the data-plane connectivity issue between host-A 110A and host-B 110B based on the report message(s) from host-A 110A and/or host-B 110B. At 330 and in FIG. 3, SDN controller 160 determines one or more candidates that may operate as an intermediate host between host-A 110A and host-B 110B. In practice, SDN controller 160 may maintain an N-by-N connectivity status matrix where N is the number of hosts (e.g., N=4), and the $ij^{th}$ element represents the status of the data-plane connectivity between the $i^{th}$ and $j^{th}$ hosts. The matrix may be updated over time based on report message(s) from various hosts 110A-D. For example in FIG. 4, SDN controller 160 determines that host-C 110C and host-D 110D each have data-plane connectivity with both host-A 110A and host-B 110B.

At 335 in FIG. 3, SDN controller 160 selects at least one candidate to be an intermediate host between host-A 110A and host-B 110B. Of course, if there is only one candidate (e.g., host-C 110C), that candidate will be automatically selected. Otherwise, in the case of multiple candidates, one of them may be selected at random or based on any additional criterion or criteria. For example, host-C 110C may be selected over host-D 110B based on its CPU utilization, memory utilization, network resource utilization, physical location (e.g., rack, pod, chassis, data center), whether host-C 110C is already configured as an intermediate host for another pair of hosts, any combination thereof, etc. In another example, host-C 110C may be selected over host-D 110B based on other metric(s), such as RTT, network bandwidth, packet loss, packet delay, a load balancing factor (e.g., assigned weight or hash value of IP address), etc. This way, load balancing may be performed to reduce the likelihood of overburdening one host with traffic that is not destined for that host.

Further, if a performance issue detected at block 310/325, host-C 110C may be selected to improve performance. For example, host-C 110C may be selected such that RTT (source=VTEP-A, destination=VTEP-B) is greater than a combined total of RTT(VTEP-A, VTEP-C) and RTT(VTEP-C, VTEP-B). As explained using FIG. 1, VTEP-A is implemented by hypervisor-A 114A, VTEP-B by hypervisor-B 114B and VTEP-C by hypervisor-C 114C. In this case, a direct forwarding path between VTEP-A and VTEP-B is considered to be sub-optimal compared to an indirect forwarding path via VTEP-C.

Host-C 110C may also be selected based on any other metric(s), regardless of whether there is a data-plane connectivity issue between host-A 110A and host-B 110B. For example, a particular data center tenant may have a number of workloads that are spread over multiple cloud providers that charge different rates for resource consumption (e.g., network resource). In this case, host-C 110C may be selected based on a comparison between (a) a first cost associated with a direct path (i.e., A-B) from host-A 110A to host-B 110B, and (b) a second cost associated with an indirect path (i.e., A-C-B) via host-C 110C. For example, host-C 110C may be selected based on cost(A-C-B)<cost(A-B). Additionally, host-C 110C may be selected over host-D 110D based on cost(A-C-B)<cost(A-D-B), which means it is more cost-effective to send encapsulated packets via host-C 110C compared to host-D 110D. This way, cost optimization may be performed to select a more cost-effective path for host-A 110A to communicate with host-B 110B. Any alternative or additional intermediate hosts may be selected to update the path between host-A 110A and host-B 110B dynamically.

At 340 in FIG. 3, SDN controller 160 configures host-A 110A and/or host-B 110B to maintain data-plane connectivity by forwarding encapsulated packets via host-C 110C. For example, this may involve SDN controller 160 sending configuration information to host-A 110A (see 460 in FIG. 4) and/or host-B 110B (see 470 in FIG. 4).

At 345 and 350 in FIG. 3, in response to receiving the configuration information from SDN controller 160, host-A 110A and/or host-B 110B identifies host-C 110C as an intermediate host. Where applicable, at 355, one or more forwarding rules may be configured at host-A 110A and/or host-B 110B. In one example, based on the configuration information from SDN controller 160, a forwarding rule may be configured to program virtual switch 116A/116B at host 110A/110B to send encapsulated packets via host-C 110C.

At 360 in FIG. 3, SDN controller 160 may also configure intermediate host-C 110C to relay encapsulated packets between host-A 110A and host-B 110B. At 365 and 370, in response to receiving configuration information (see 480 in FIG. 4) from SDN controller 160, host-C 110C performs any suitable configuration to operate as an intermediate host, such as by configuring forwarding rule(s) to program virtual switch 116C to forward encapsulated packets between host-A 110A and host-B 110B. The forwarding rules at blocks 355 and 370 may be generated using any suitable protocol, such as OpenFlow, etc. Example forwarding rules 465, 475 and 485 shown in FIG. 4 will be discussed further below.

Maintaining Data-Plane Connectivity Via Intermediate Host

Figure 5:
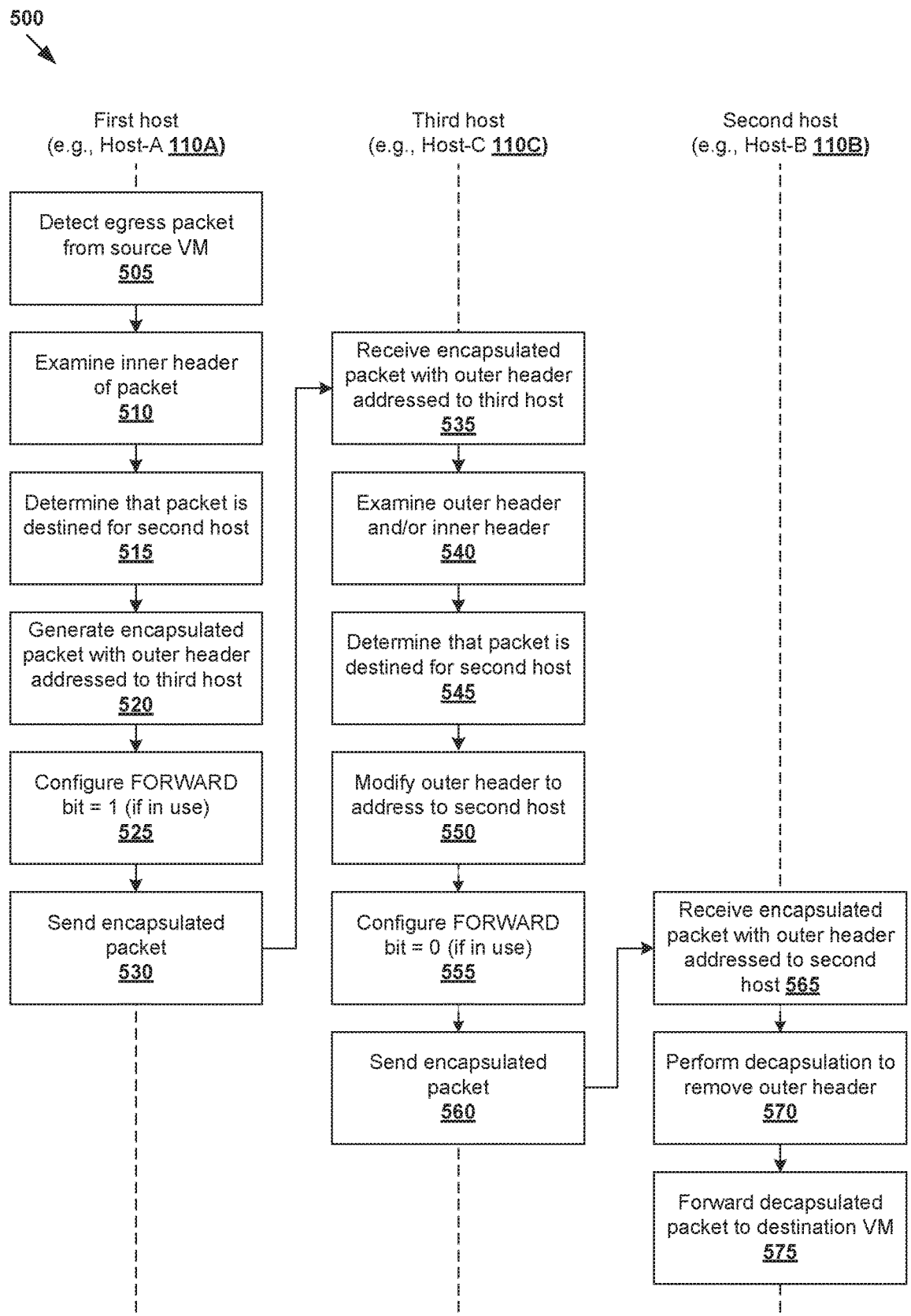
FIG. 5 is a flowchart of an example detailed process for maintaining data-plane connectivity between a first host and a second host via a third host in a virtualized computing environment.

FIG. 5 is a flowchart of example detailed process 500 for maintaining data-plane connectivity between a first host and a second host via a third host in virtualized computing environment 100. Example process 500 may include one or more operations, functions, or actions illustrated by one or more blocks, such as 505 to 575. The various blocks may be combined into fewer blocks, divided into additional blocks, and/or eliminated depending on the desired implementation.

Example process 500 may be implemented by host 110A/110B/110C using hypervisor 114A/114B/114C, and SDN controller 160 using central control plane module 162, etc. The example in FIG. 5 will be discussed using FIG. 6, which is a schematic diagram illustrating example 600 of maintaining data-plane connectivity between a first host and a second host via a third host. In the following, consider the case where source VM1 131 on host-A 110A sends packets to destination VM3 133 on host-B 110B. Both VM1 131 and VM3 133 are located on VXLAN5001.

At 505, 510 and 515 in FIG. 5, in response to detecting egress packet 610, host-A 110A examines inner header 612 to determine whether egress packet 610 is destined for host-B 110B. In the example in FIG. 6, egress packet 610 includes payload 614 and inner header 612, which is addressed from (IP-1, MAC-1) associated with source VM1 131 to (IP-3, MAC-3) associated with destination VM3 133. Based on the destination address information, it is determined that egress packet 610 is destined for host-B 110B.

At 520 in FIG. 5, host-A 110A generates encapsulated packet 620 by encapsulating egress packet 610 with outer header 622. In particular, since host-C 110C has been configured as an intermediate host, outer header 622 is addressed from (VTEP IP=IP-A, MAC=MAC-A) associated with a source VTEP-A implemented by host-A 110A to (VTEP IP=IP-C, MAC=MAC-C) associated with a destination VTEP-C implemented by host-C 110C, instead of host-B 110B. Outer header 622 also includes source address information, and VNI=5001 identifies the logical overlay network on which source VM1 131 is located.

As mentioned using FIG. 4, host-A 110A may be programmed to perform blocks 510, 515 and 520 using forwarding rule 465. In particular, forwarding rule 465 may be configured based on configuration information 460 from SDN controller 160 to cause host-A 110A to match the destination address information in inner header 612 to (IP-3, MAC-3) associated with VM3 133 or (IP-4, MAC-4) associated with VM4 134 on host-B 110B. If a match is found, host-A 110A performs action=configure outer header 622 to address encapsulated packet 620 from (IP-A, MAC-A) to (IP-C, MAC-C). Note that an address range may be specified in forwarding rule 465/475/485, instead of individual addresses. The match may be based on IP and/or MAC address information, or any other packet header information.

At 525 in FIG. 5, depending on the desired implementation, outer header 622 may be configured with a special bit 624 (e.g., "Forward Required" or "Forward" bit=1) to indicate to host-C 110C that encapsulated packet 620 is not destined for host-C 110C and should be forwarded to another host. As will be discussed below, it is not necessary to set bit 624 if intermediate host-C 110C is configured by SDN controller 160 using forwarding rule(s).

At 530 and 535 in FIG. 5, since host-C 110C has data-plane connectivity with host-A 110A, host-C 110C receives encapsulated packet 620 sent by host-A 110A. At 540 and 545, host-C 110C examines outer header 622 and/or inner header 612 to determine that encapsulated packet 620 is destined for host-B 110B. In one example, the determination at block 545 may be based on "Forward" bit 624 (if in use) in outer header 622. Further, based on (IP-3, MAC-3) associated with VM3 133 in inner header 612 and mapping information that associates VM3 133 with host-B 110B, it is determined that encapsulated packet 620 is destined for host-A 110A.

Alternatively, the determination at block 545 may be based on forwarding rules 485 configured by SDN controller 160. In particular, one forwarding rule causes host-C 110C to match the destination address information in inner header 612 with (IP-3, MAC-3) associated with VM3 133 or (IP-4, MAC-4) associated with VM4 134 on host-B 110B. If a match is found, host-C 110C generates encapsulated packet 630 with modified outer header 632 as follows. This way, host-C 110C does not have to rely on "Forward" bit 624 to learn that it is not the intended destination.

At 550 and 560 in FIG. 5, host-C 110C generates and sends modified encapsulated packet 630. In particular, modified outer header 632 is configured by updating the destination address information from (IP-C, MAC-C) in outer header 622 to (IP-B, MAC-B). Where applicable, outer header 632 specifies "Forward" bit=0 634 at block 555.

At 565, 570 and 575 in FIG. 5, in response to receiving encapsulated packet 630 from host-C 110C, host-B 110B performs decapsulation to remove outer header 632 and forwards decapsulated packet 640 to destination VM3 133.

Figure 6:
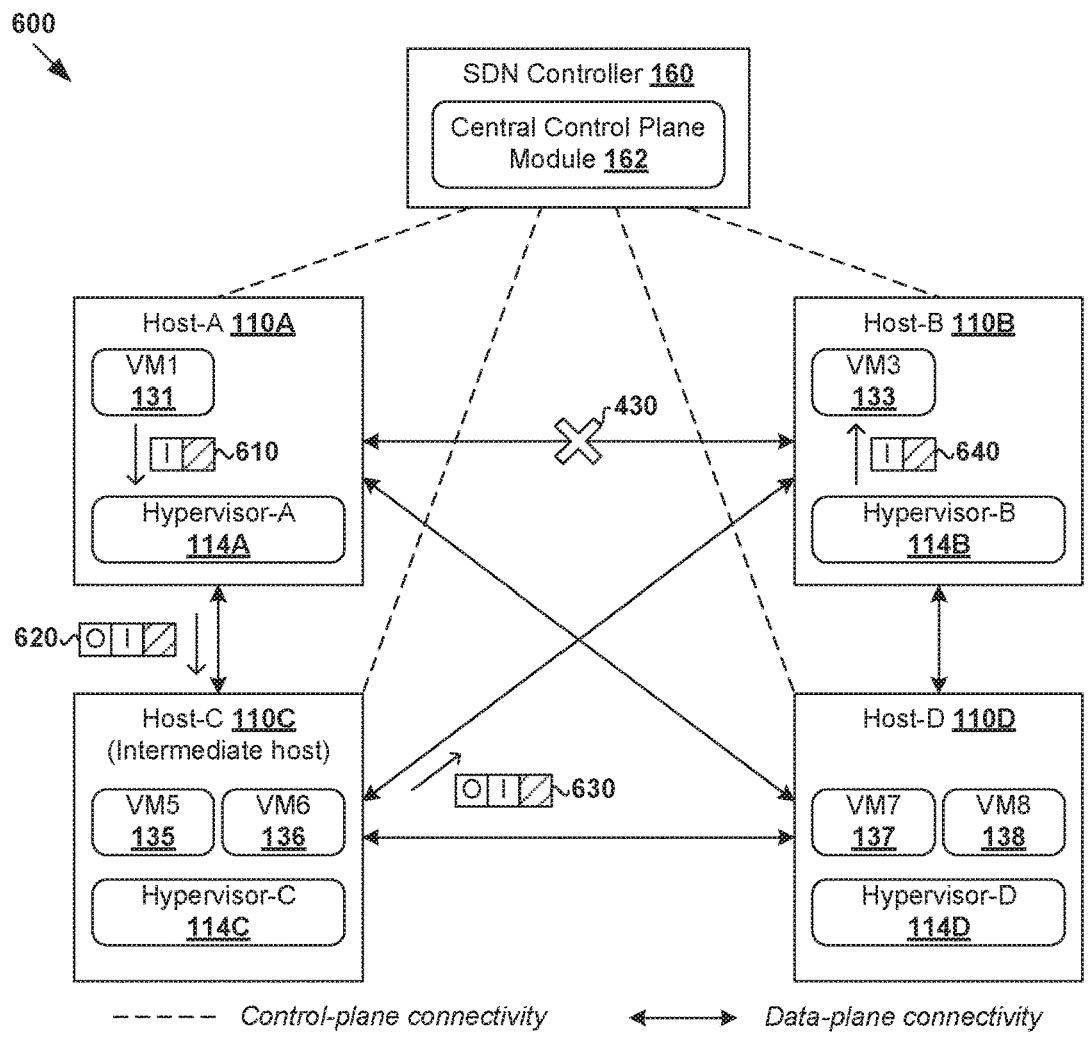
FIG. 6 is a schematic diagram illustrating an example of maintaining data-plane connectivity between a first host and a second host via a third host in a virtualized computing environment.

Although not shown in FIG. 5 and FIG. 6, it should be understood that host-C 110C may also forward encapsulated packets from host-B 110B to host-A 110A on the reverse path. For example, in response to detecting an egress packet from VM3 133 to VM1 131, forwarding rule 475 in FIG. 4 causes host-B 110B to match the destination address information in the inner header with (IP-1, MAC-1) associated with VM1 131. If a match is found, host-B 110B then generates and sends an encapsulated packet with an outer header that is addressed from (IP-B, MAC-B) to (IP-C, MAC-C). Based on forwarding rules 485, host-C 110C modifies the outer header to specify (IP-A, MAC-A) as the destination, and forwards the encapsulated packet to host-A 110A.

In practice, encapsulated packet 630 may include a label of a source VTEP implemented by host-A 110A. This is to inform host-B 110B that encapsulated packet 630 originates from host-A 110A, and host-C 110C operates as an intermediate host. Host-B 110B will then send any encapsulated packets destined for host-A 110A via host-C 110C. In this case, it is not necessary for SDN controller 160 to program the reverse path on host-B 110B. Once the data-plane connectivity issue is resolved, host-A 110A and/or host-B 110B may report to SDN controller 160 accordingly to revert back to the direct forwarding path.

Figure 7:
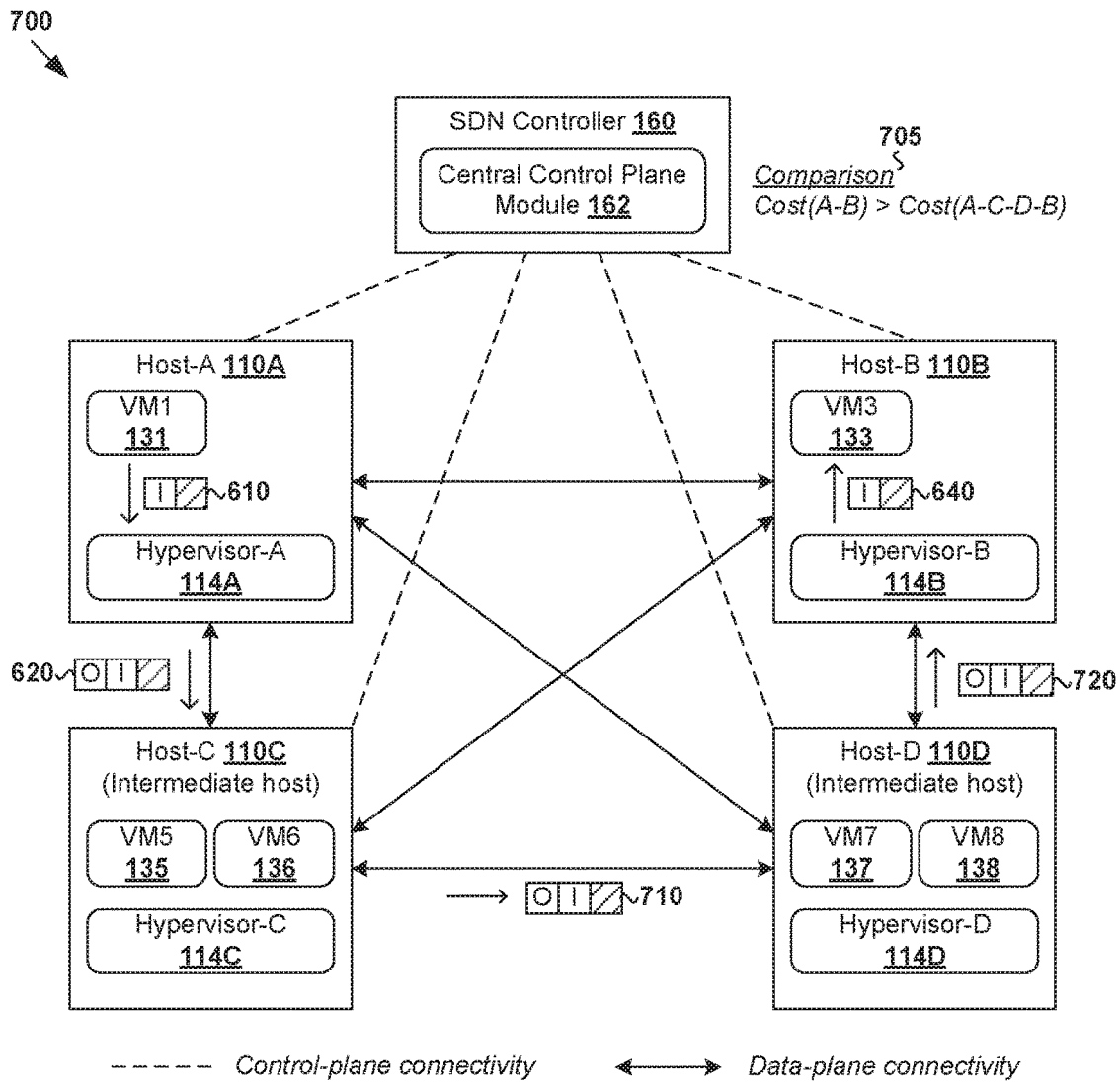
FIG. 7 is a schematic diagram illustrating an example of maintaining data-plane connectivity between a first host and a second host via multiple intermediate hosts in a virtualized computing environment.

FIG. 7 is a schematic diagram illustrating example 700 of maintaining data-plane connectivity between a first host and a second host via multiple intermediate hosts in a virtualized computing environment. In the example in FIG. 7, both host-C 110C and host-D 110D are selected as intermediate hosts. Host-C 110C has data-plane connectivity with host-A 110A and host-D 110D, which in turn has data-plane connectivity with host-B 110B. In this example, no data-plane connectivity issue has been detected between VTEP-A at host-A 110A and VTEP-B at host-B 110B (i.e., blocks 310-325 in FIG. 3 are not performed). The intermediate hosts may be selected based on cost(A-B)>cost(A-C-D-B), where cost(A-B) is associated with a direct path between host-A 110A and host-B 110B and cost(A-C-D-B) with an indirect path via host-C 110C and host-D 110D. See also 705 in FIG. 7.

At first intermediate host-C 110C, in response to receiving encapsulated packet 620 (see FIG. 6) from source host-A 110A, encapsulated packet 710 is generated and sent. Outer header 712 identifies source VTEP=(IP-C, MAC-C) at host-C 110C and destination VTEP=(IP-D, MAC-D) at host-D 110D. Where applicable, forward bit 714 may be set (i.e., bit=1).

At second intermediate host-D 110D, in response to receiving encapsulated packet 710 from host-C 110C, encapsulated packet 720 is generated and sent. Outer header 722 identifies source VTEP=(IP-D, MAC-D) at host-D 110D and destination VTEP=(IP-B, MAC-B) at host-B 110B. Where applicable, forward bit 724 may be unset (i.e., bit=0).

At destination host-B 110B, outer header 722 is removed from encapsulated packet 720, and decapsulated packet 640 is forwarded to VM3 133 based on inner header 612. As such, according to examples of the present disclosure, as long as there is at least one intermediate host that has (direct or indirect) data-plane connectivity with affected hosts 110A-B, the logical overlay network connectivity between VM1 131 and VM3 133 will not be disrupted. For the reverse path, host-B 110B may send encapsulated packets to host-A 110A via host-D 110D and host-C 110C, or any additional or alternative intermediate hosts. For example, a reverse path via intermediate host-E (not shown) may be configured if cost(B-E-A)<cost(B-D-C-A).

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 7. For example, a computer system may be deployed in virtualized computing environment 100 to perform the functionality of a network management entity (e.g., SDN controller 160), first host (e.g., host-A 110A), second host (e.g., host 110B) or third host (e.g., host-C 110C or host-D 110D).

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a first host to maintain data-plane connectivity with a second host via a third host in a virtualized computing environment that includes the first host, the second host, and the third host, the method comprising:

identifying an intermediate host, being the third host, having data-plane connectivity with both the first host and the second host; and in response to detecting, from a first virtualized computing instance supported by the first host, an egress packet that includes an inner header addressed to a second virtualized computing instance supported by the second host:

generating an encapsulated packet by encapsulating the egress packet with an outer header that is addressed from a network layer address of the first host to a network layer address of the third host instead of a network layer address of the second host; and sending the encapsulated packet to the third host for subsequent forwarding to the second host, wherein the third host:

receives the encapsulated packet, modifies the outer header of the received encapsulated packet to be addressed from the network layer address of the third host to the network layer address of the second host, instead of from the network layer address of the first host to the network layer address of the third host, and sends the encapsulated packet with the modified outer header to the second host.

2. The method of claim 1, wherein identifying the intermediate host comprises:

based on configuration information from a network manager, configuring a forwarding rule to cause the first host to generate the encapsulated packet in response to determining that the egress packet is destined for the second host based on the inner header.

3. The method of claim 1, wherein identifying the intermediate host comprises:

identifying the third host based on configuration information from a network manager, wherein the third host is selected to be the intermediate host based on one or more of: round trip time, network bandwidth, packet loss, packet delay, a load balancing factor, central processing unit (CPU) utilization, memory utilization, network resource utilization, physical location, and whether the third host is already configured as an intermediate host for another pair of hosts.

4. The method of claim 1, wherein identifying the intermediate host comprises:

identifying the third host based on configuration information from a network manager, wherein the third host is selected to be the intermediate host based on a comparison between (a) a first cost associated with a first path from the first host and the second host and (b) a second cost associated with a second path from the first host and the second host via the third host.

5. The method of claim 1, wherein generating the encapsulated packet comprises one or more of:
configuring the outer header to include address information of a source virtual tunnel endpoint (VTEP) implemented by the first host and a destination VTEP implemented by the third host;
configuring the outer header to include an identifier of a logical overlay network on which the first virtualized computing instance is located; and
configuring the outer header include a bit to indicate, to the third host, that the encapsulated packet is not destined for the third host.

6. The method of claim 1, further comprising:
prior to detecting the egress packet, detecting a data-plane connectivity issue between the first host and the second host.

7. The method of claim 6, wherein detecting the data-plane connectivity issue comprises:
detecting a loss of data-plane connectivity or a performance issue associated with data-plane connectivity between the first host and the second host; and
sending, to a network manager, a report message indicating the loss or the performance issue.

8. A non-transitory computer-readable storage medium that includes a set of instructions which, in response to execution by a processor of a first host, cause the processor to perform a method to maintain data-plane connectivity with a second host via a third host in a virtualized computing environment that includes the first host, the second host, and the third host, wherein the method comprises:
identifying an intermediate host, being the third host, having data-plane connectivity with both the first host and the second host; and
in response to detecting, from a first virtualized computing instance supported by the first host, an egress packet that includes an inner header addressed to a second virtualized computing instance supported by the second host:
generating an encapsulated packet by encapsulating the egress packet with an outer header that is addressed from a network layer address of the first host to a network layer address of the third host instead of a network layer address of the second host; and
sending the encapsulated packet to the third host for subsequent forwarding to the second host, wherein the third host:
receives the encapsulated packet,
modifies the outer header of the received encapsulated packet to be addressed from the network layer address of the third host to the network layer address of the second host, instead of from the network layer address of the first host to the network layer address of the third host, and
sends the encapsulated packet with the modified outer header to the second host.

9. The non-transitory computer-readable storage medium of claim 8, wherein identifying the intermediate host comprises:
based on configuration information from a network manager, configuring a forwarding rule to cause the first host to generate the encapsulated packet in response to determining that the egress packet is destined for the second host based on the inner header.

10. The non-transitory computer-readable storage medium of claim 8, wherein identifying the intermediate host comprises:
identifying the third host based on configuration information from a network manager, wherein the third host is selected to be the intermediate host based on one or more of: round trip time, network bandwidth, packet loss, packet delay, a load balancing factor, central processing unit (CPU) utilization, memory utilization, network resource utilization, physical location, and whether the third host is already configured as an intermediate host for another pair of hosts.

11. The non-transitory computer-readable storage medium of claim 8, wherein identifying the intermediate host comprises:
identifying the third host based on configuration information from a network manager, wherein the third host is selected to be the intermediate host based on a comparison between (a) a first cost associated with a first path from the first host and the second host and (b) a second cost associated with a second path from the first host and the second host via the third host.

12. The non-transitory computer-readable storage medium of claim 8, wherein generating the encapsulated packet comprises one or more of:
configuring the outer header to include address information of a source virtual tunnel endpoint (VTEP) implemented by the first host and a destination VTEP implemented by the third host;
configuring the outer header to include an identifier of a logical overlay network on which the first virtualized computing instance is located; and
configuring the outer header include a bit to indicate, to the third host, that the encapsulated packet is not destined for the third host.

13. The non-transitory computer-readable storage medium of claim 8, wherein the method further comprises:
prior to detecting the egress packet, detecting a data-plane connectivity issue between the first host and the second host.

14. The non-transitory computer-readable storage medium of claim 13, wherein detecting the data-plane connectivity issue comprises:
detecting a loss of data-plane connectivity or a performance issue associated with data-plane connectivity between the first host and the second host; and
sending, to a network manager, a report message indicating the loss or the performance issue.

15. A first host configured to maintain data-plane connectivity with a second host via a third host in a virtualized computing environment that includes the first host, the second host, and the third host, the first host comprising:
a processor; and
a non-transitory computer-readable medium having stored thereon instructions that, in response to execution by the processor, cause the processor to:
identify an intermediate host, being the third host, having data-plane connectivity with both the first host and the second host; and
in response to detecting, from a first virtualized computing instance supported by the first host, an egress packet that includes an inner header addressed to a second virtualized computing instance supported by the second host:
generate an encapsulated packet by encapsulating the egress packet with an outer header that is addressed from a network layer address of the first host to a network layer address of the third host instead of a network layer address of the second host; and send the encapsulated packet to the third host for subsequent forwarding to the second host, wherein the third host:

receives the encapsulated packet, modifies the outer header of the received encapsulated packet to be addressed from the network layer address of the third host to the network layer address of the second host, instead of from the network layer address of the first host to the network layer address of the third host, and sends the encapsulated packet with the modified outer header to the second host.

16. The first host of claim 15, wherein the instructions that cause the processor to identify the intermediate host cause the processor to:

based on configuration information from a network manager, configure a forwarding rule to cause the first host to generate the encapsulated packet in response to determination that the egress packet is destined for the second host based on the inner header.

17. The first host of claim 15, wherein the instructions that cause the processor to identify the intermediate host cause the processor to:

identify the third host based on configuration information from a network manager, wherein the third host is selected to be the intermediate host based on one or more of: round trip time, network bandwidth, packet loss, packet delay, a load balancing factor, central processing unit (CPU) utilization, memory utilization, network resource utilization, physical location, and whether the third host is already configured as an intermediate host for another pair of hosts.

18. The first host of claim 15, wherein the instructions that cause the processor to identify the intermediate host cause the processor to:

identify the third host based on configuration information from a network manager, wherein the third host is selected to be the intermediate host based on a comparison between (a) a first cost associated with a first path from the first host and the second host and (b) a second cost associated with a second path from the first host and the second host via the third host.

19. The first host of claim 15, wherein the instructions that cause the processor to generate the encapsulated packet cause the processor to perform one or more of:

configure the outer header to include address information of a source virtual tunnel endpoint (VTEP) implemented by the first host and a destination VTEP implemented by the third host;

configure the outer header to include an identifier of a logical overlay network on which the first virtualized computing instance is located; and configure the outer header include a bit to indicate, to the third host, that the encapsulated packet is not destined for the third host.

20. The first host of claim 15, wherein the instructions further cause the processor to:

prior to detecting the egress packet, detect a data-plane connectivity issue between the first host and the second host.

21. The first host of claim 20, wherein the instructions that cause the processor to detect the data-plane connectivity issue cause the processor to:

detect a loss of data-plane connectivity or a performance issue associated with data-plane connectivity between the first host and the second host; and send, to a network manager, a report message indicating the loss or the performance issue.

* * * * *